United States Patent
Shinohara

(10) Patent No.: US 11,799,685 B2
(45) Date of Patent: Oct. 24, 2023

(54) COMMUNICATION RELAY DEVICE, COMMUNICATION RELAY SYSTEM, COMMUNICATION RELAY METHOD, AND PROGRAM

(71) Applicant: Nippon Telegraph and Telephone Corporation, Tokyo (JP)

(72) Inventor: Kenta Shinohara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/015,894

(22) PCT Filed: Jul. 13, 2020

(86) PCT No.: PCT/JP2020/027216
§ 371 (c)(1),
(2) Date: Jan. 12, 2023

(87) PCT Pub. No.: WO2022/013908
PCT Pub. Date: Jan. 20, 2022

(65) Prior Publication Data
US 2023/0246877 A1    Aug. 3, 2023

(51) Int. Cl.
*H04L 12/44* (2006.01)
*H04L 5/00* (2006.01)
(Continued)

(52) U.S. Cl.
CPC ............ *H04L 12/44* (2013.01); *H04L 5/0048* (2013.01); *H04L 61/2517* (2013.01); *H04L 61/2575* (2013.01)

(58) Field of Classification Search
CPC . H04L 61/2575; H04L 61/2517; H04L 61/00; H04L 12/44; H04L 5/0048
See application file for complete search history.

(56) References Cited

U.S. PATENT DOCUMENTS

| | | | |
|---|---|---|---|
| 7,072,933 B1* | 7/2006 | Lamb | H04L 63/10 726/5 |
| 7,650,427 B1* | 1/2010 | Liu | H04L 63/102 709/227 |

(Continued)

FOREIGN PATENT DOCUMENTS

| | | |
|---|---|---|
| CN | 103442092 A | * 12/2013 |
| EP | 1892921 A2 | * 2/2008 |

(Continued)

OTHER PUBLICATIONS

[No Author Listed] [online], "Production-Grade Container Orchestration—Kubernetes," Cloud Native Computing Foundation, retrieved on May 20, 2020, retrieved from URL <https://kubernetes.io/>, 8 pages.

*Primary Examiner* — Shean Tokuta
(74) *Attorney, Agent, or Firm* — Fish & Richardson P.C.

(57) ABSTRACT

There are provided a forward relay unit (31) configured to distribute a request from a radius client (1) which is a facing node of a microservice to the microservice to one of servers (5a and 5b) accommodating the microservice; and a backward relay unit (34) configured to perform NAPT on a request from the microservice to an address band of the facing node, and return a response from the facing node to the request to the microservice in a reverse order of a path along which the request has passed. Accordingly, in a microservice infrastructure on which an NFV application requiring IP authentication is mounted, it is possible to satisfy a requirement of an application of a request transmitted from a microservice to a facing node.

9 Claims, 12 Drawing Sheets

(51) Int. Cl.
*H04L 61/2575* (2022.01)
*H04L 61/2517* (2022.01)

(56) References Cited

U.S. PATENT DOCUMENTS

| | | | |
|---|---|---|---|
| 7,653,746 B2 * | 1/2010 | Touch | H04L 67/10 709/239 |
| 9,032,092 B1 * | 5/2015 | Sinn | H04L 61/2514 709/239 |
| 10,469,446 B1 * | 11/2019 | Chigurupati | H04L 63/0892 |
| 10,880,434 B2 * | 12/2020 | Cohen | H04L 67/02 |
| 2004/0133690 A1 * | 7/2004 | Chauffour | H04L 67/1031 709/225 |
| 2005/0005006 A1 * | 1/2005 | Chauffour | H04L 67/1029 709/223 |
| 2005/0132030 A1 * | 6/2005 | Hopen | H04L 41/12 709/223 |
| 2008/0228772 A1 * | 9/2008 | Plamondon | G06F 16/9574 |
| 2011/0191223 A1 * | 8/2011 | Singh | G06Q 30/04 709/224 |
| 2011/0235595 A1 * | 9/2011 | Mehta | H04W 8/082 370/329 |
| 2012/0042084 A1 * | 2/2012 | Dutta | H04L 67/1004 709/228 |
| 2012/0243536 A1 * | 9/2012 | Fernandez | H04L 12/1886 370/390 |
| 2014/0258705 A1 * | 9/2014 | Roskind | H04L 63/0254 713/150 |
| 2014/0372616 A1 * | 12/2014 | Arisoylu | H04L 67/1001 709/226 |
| 2015/0358236 A1 * | 12/2015 | Roach | H04L 47/22 370/235 |
| 2016/0072766 A1 * | 3/2016 | Jain | H04L 67/141 709/228 |
| 2016/0301724 A1 * | 10/2016 | Kodaypak | H04L 43/0817 |
| 2017/0244787 A1 * | 8/2017 | Rangasamy | H04L 41/5045 |
| 2018/0091603 A1 * | 3/2018 | Sarangapani | H04L 43/0864 |
| 2018/0332060 A1 * | 11/2018 | Johnson | H04L 63/0236 |
| 2019/0052520 A1 * | 2/2019 | Luo | H04L 41/0816 |
| 2019/0260610 A1 * | 8/2019 | Dubey | H04L 67/60 |
| 2019/0288986 A1 * | 9/2019 | Mayuzumi | H04L 63/126 |
| 2020/0233719 A1 * | 7/2020 | Saini | H04L 41/0806 |
| 2020/0252449 A1 * | 8/2020 | Wood | H04L 67/01 |
| 2021/0021518 A1 * | 1/2021 | Chand | H04L 45/021 |
| 2021/0021564 A1 * | 1/2021 | Chand | H04L 63/166 |
| 2021/0021565 A1 * | 1/2021 | Chand | H04L 61/2596 |
| 2022/0311821 A1 * | 9/2022 | Shah | H04L 67/1014 |

FOREIGN PATENT DOCUMENTS

| | | | | |
|---|---|---|---|---|
| EP | 2713583 A1 | * | 4/2014 | |
| EP | 2849406 A1 | * | 3/2015 | |
| EP | 2897340 A1 | * | 7/2015 | H04L 65/4084 |
| JP | 2006235837 A | * | 9/2006 | |
| JP | 2010226665 A | * | 10/2010 | |
| JP | 2015118684 A | * | 6/2015 | |
| JP | 2017005375 A | * | 1/2017 | |
| WO | WO-2004088954 A1 | * | 10/2004 | H04L 29/12386 |
| WO | WO-2014059844 A1 | * | 4/2014 | |
| WO | WO-2017127225 A1 | * | 7/2017 | G06F 9/45558 |
| WO | WO-2022013908 A1 | * | 1/2022 | |

* cited by examiner

Fig. 9

| ↓ BEFORE CHANGE/AFTER CHANGE → | Active | Backup | Fault |
|---|---|---|---|
| Active | — | FACING NIC | NO CHANGE |
| Backup | OWN NIC | — | NO CHANGE |
| Fault | NO CHANGE | NO CHANGE | — |

COMMUNICATION RELAY DEVICE, COMMUNICATION RELAY SYSTEM, COMMUNICATION RELAY METHOD, AND PROGRAM

CROSS-REFERENCE TO RELATED APPLICATIONS

This application is a National Stage application under 35 U.S.C. § 371 of International Application No. PCT/JP2020/027216, having an International Filing Date of Jul. 13, 2020.

The disclosure of the prior application is considered part of the disclosure of this application, and is incorporated by reference in its entirety into this application.

TECHNICAL FIELD

The present invention relates to a communication relay device, a communication relay system, a communication relay method, and a program.

BACKGROUND ART

In recent years, a microservice type application, which is one new type of application architectures and applications related to virtualized network function virtualization (NFV) of communication systems have become widespread.

A representative example of the microservice type application is software called kubernetes (registered trademark) disclosed in Non Patent Literature 1. Hereinafter, the term "kubernetes" is simply described, and the description "registered trademark" is omitted.

The microservice infrastructure includes a server group containing microservices and a distribution device (a load balancer) that distributes requests to each server. The microservice infrastructure implements an application by running a virtual node such as a container on a server cluster. Virtual nodes such as these containers receive packets from facing nodes of the application via a load balancer.

CITATION LIST

Non Patent Literature

Non Patent Literature 1: "Kubernetes", Internet, <URL: https://kubernetes.io/>

SUMMARY OF INVENTION

Technical Problem

A radius client is a facing node. A radius server of the microservice is deployed on a server. Requests from facing nodes are distributed to radius servers via a load balancer.

As an NFV application, there is a protocol that has an IP address as a parameter and uses information regarding the IP address in an authentication process as in a radius protocol. However, in a system having such a configuration, communication from a microservice to a facing node is directly transmitted from a server cluster to the facing node without passing through the load balancer.

Communication from the radius server to the radius client does not pass through the load balancer. As a result, the radius client, which is the facing node, receives a request having the address of the radius server as the transmission source address. However, an IP address expected by the facing node is the IP address of the load balancer. Therefore, in the case of an application such as radius authentication requiring IP authentication, the communication path does not satisfy requirements, and the authentication may fail.

In radius authentication, an authorization change function called change of authorization (CoA) is supplied, and a mechanism for changing attributes of authentication, authorization, and accounting sessions after session authentication is supplied. The radius authorization change function is request transmission from a radius server to a radius client (terminal). There is a disconnect request for disconnecting a session of the terminal from the radius server.

In addition to the radius authentication, there are cases where it is necessary to transmit a packet to another communication device in response to a communication control request. For example, functions such as a mobility management entity (MME), a serving gateway (SGW), a packet data network gateway (PGW), and a policy and charging rules function (PCRF) are required for session processing, and they perform a series of session processing by communicating with each other. When one of these functions is on a microservice infrastructure, communication from the microservice infrastructure to an external node will occur.

Accordingly, an objective of the present invention is to satisfy a requirement of an application of a request transmitted from a microservice to a facing node in a microservice infrastructure on which an NFV application requiring IP authentication is mounted.

Solution to Problem

In order to solve the foregoing problem, according to an aspect of the present invention, a communication relay device includes: a forward relay unit configured to distribute a request from a facing node of a microservice to the microservice to one of server groups accommodating the microservice; and a backward relay unit configured to perform NAPT on a request from the microservice to an address band of the facing node, and return a response from the facing node to the request to the microservice in a reverse order of a path along which the request has passed.

Other means will be described in the mode for carrying out the invention.

Advantageous Effects of Invention

According to the present invention, in a microservice infrastructure in which an NFV application requiring IP authentication is mounted, it is possible to satisfy a requirement of an application of a request transmitted from a microservice to a facing node.

BRIEF DESCRIPTION OF DRAWINGS

FIG. 9 is a diagram illustrating a state transition table of Nginx (registered trademark).

DESCRIPTION OF EMBODIMENTS

Hereinafter, modes for carrying out the present invention will be described in detail with reference to the drawings.

Figure 1:
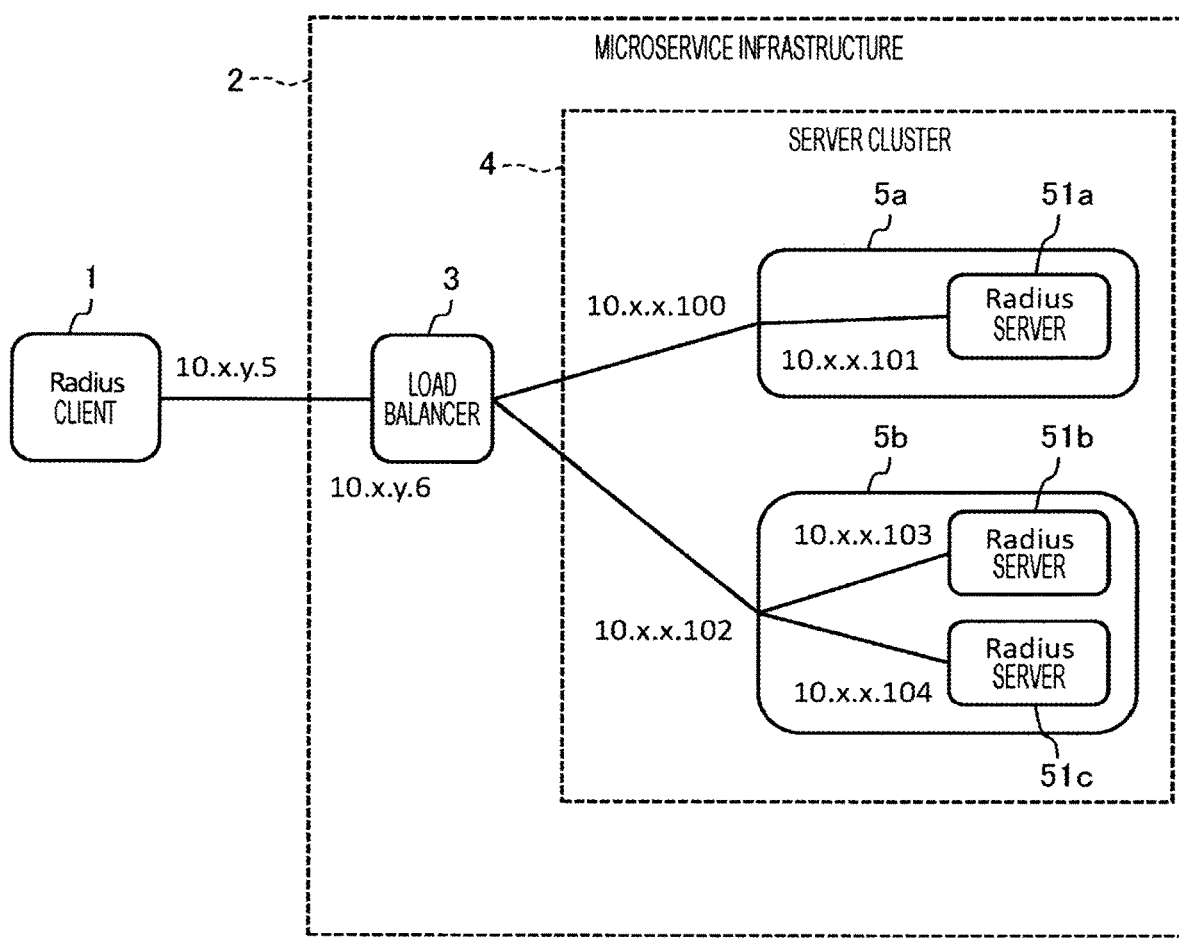
FIG. 1 is a diagram illustrating a configuration of a microservice infrastructure.

FIG. 1 is a diagram illustrating a configuration of a microservice infrastructure 2.

The microservice infrastructure 2 includes a load balancer 3 that distributes packets from facing nodes, and a server cluster 4 that processes the distributed packets and returns responses. The microservice infrastructure 2 illustrated in FIG. 1 provides a radius authentication service to the radius client 1.

An IP address of the load balancer 3 is 10.x.y.6. An IP address of the radius client 1 is 10.x.y.5. The server cluster 4 includes a server 5a with an IP address 10.x.x.100 and a server 5b with an IP address 10.x.x.102.

In the server 5a, a radius server 51a is deployed as a container. An IP address 10.x.x.101 is assigned to the radius server 51a.

In the server 5b, radius servers 51b and 51c are deployed as containers. An IP address 10.x.x.103 is assigned to the radius server 51b. An IP address 10.x.x.104 is assigned to the radius server 51c.

Figure 2:
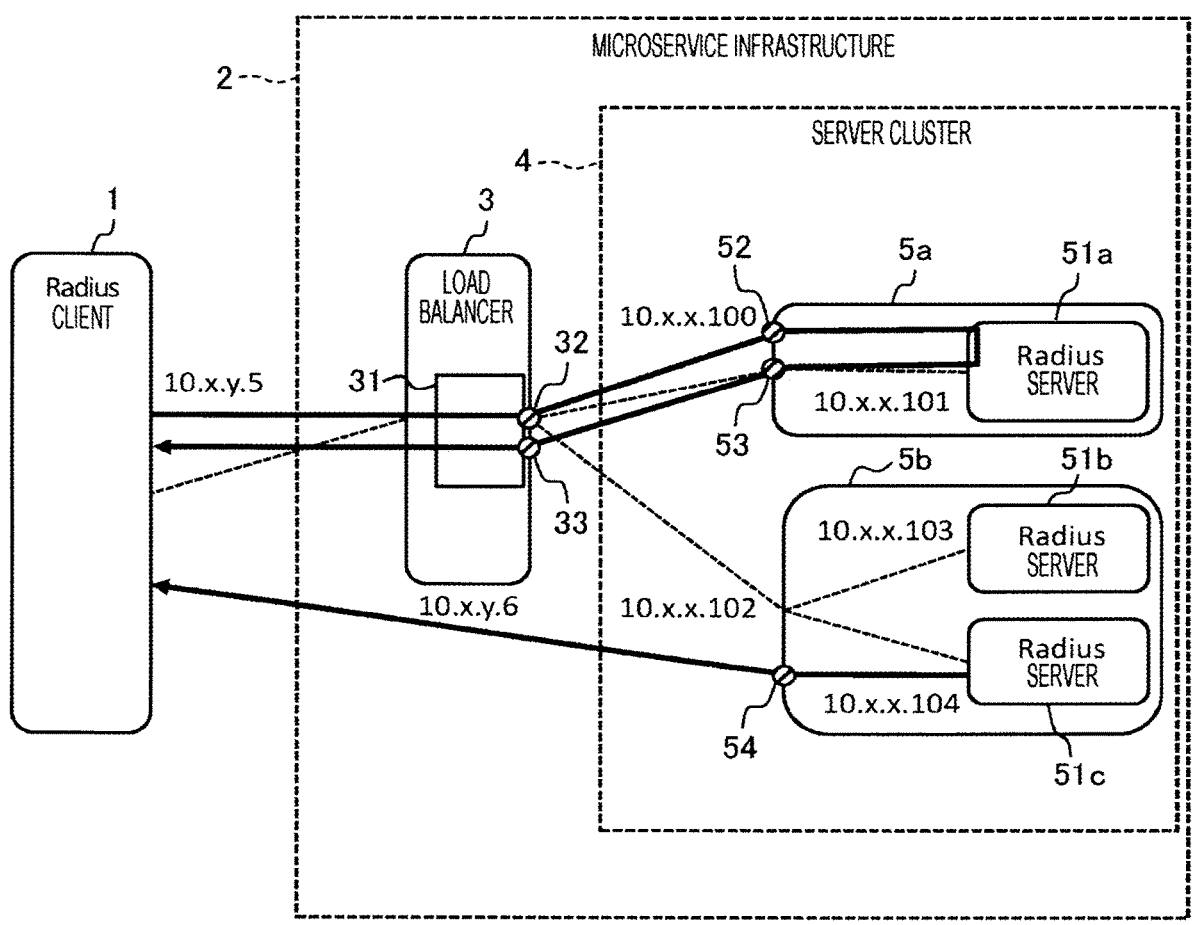
FIG. 2 is a diagram illustrating an operation of transmitting a request from a server cluster to a facing node in an operation of a microservice infrastructure.

FIG. 2 is a diagram illustrating a request packet transmitted from the facing node to the microservice infrastructure 2 and a request packet transmitted from the server cluster 4 to the facing node.

<<Request from Facing Node to Microservice Infrastructure 2>>

The load balancer 3 includes a forward relay unit 31 and relays a request packet from the facing node to the microservice infrastructure 2 and a response packet to the request.

The radius client 1 is a facing node, for example, a terminal of a user. The radius client 1 transmits request packets to the radius servers 51a to 51c by setting the IP address 10.x.y.6 of the load balancer 3 as a destination address of the request packets. The request packets are distributed to one of the servers 5a and 5b by the load balancer 3. Specifically, the forward relay unit 31 causes a network address port translation (NAPT) unit 32 to rewrite the request packet destination to either the server 5a or 5b. In FIG. 2, the request packets are distributed to the server 5a.

When the server 5a receives these request packets, the NAPT unit 52 rewrites the destination to one of the radius servers. Here, since only the single radius server 51a is deployed, the destination of the request packet is rewritten to the IP address 10.x.x.101 of the radius server 51a.

When the request packets are received and a corresponding process is performed, the radius server 51a generates a response packet indicating a processing result and transmits the response packet to the facing node. When the response packet is received, the server 5a causes the NAPT unit 53 to rewrite the destination to the load balancer 3 to transfer the response packet.

The forward relay unit 31 of the load balancer 3 causes the NAPT unit 33 to rewrite the destination of the response packet transferred by the server 5a to transfer the response packet to the radius client 1.

<<Request from Microservice Infrastructure 2 to Facing Node>>

The radius server 51a transmits a request packet to the radius client 1 of the facing node to the server 5b. When the server 5b receives this request packet, the NAPT unit 54 rewrites the destination to the IP address of the radius client 1 to transfer the response packet. This request packet does not pass through the load balancer 3, and a transmission source address of the request packet is the IP address 10.x.x.102 of the server 5b.

The destination of the request packet from the facing node to the microservice infrastructure 2 described above is 10.x.y.6 of the load balancer 3 and is different from 10.x.x.102 of a transmission source of the request packet. In the case of an application such as radius authentication requiring IP authentication, the communication path does not satisfy a requirement, and thus authentication fails.

First Embodiment

In a first embodiment, in a microservice infrastructure on which an NFV application requiring IP authentication is mounted, a load balancer relays a request packet transmitted from a microservice to a facing node, thereby satisfying a requirement of an application.

Figure 3:
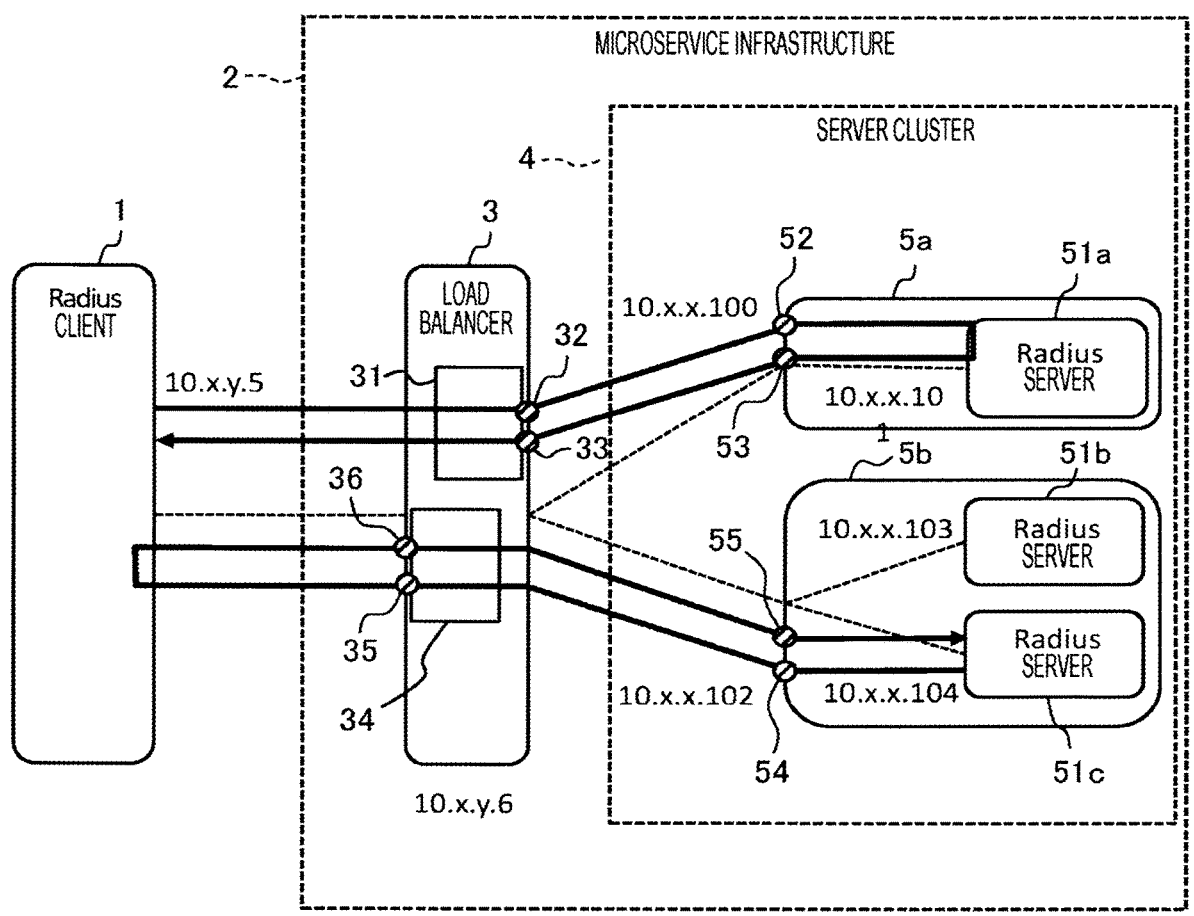
FIG. 3 is a diagram illustrating an operation of transmitting a request from a server cluster to a facing node via a load balancer in the operation of the microservice infrastructure.

FIG. 3 is a diagram illustrating an operation of transmitting a request packet from the container to a facing node via the load balancer 3.

The microservice infrastructure 2 in FIG. 3 has a configuration similar to the microservice infrastructure 2 in FIG. 1. The load balancer 3 includes a forward relay unit 31 and a backward relay unit 34, and functions as a distribution device or a communication relay device.

The forward relay unit 31 includes NAPT units 32 and 33, and distributes requests from facing nodes of the microservice infrastructure 2 to the microservice infrastructure 2 to one of the servers 5a and 5b accommodating the microservice infrastructure 2. The forward relay unit 31 causes the NAPT unit 32 to perform NAPT by rewriting a transmission source address of the request to the own address.

The backward relay unit 34 includes NAPT units 35 and 36, performs NAPT on a request from the microservice infrastructure 2 to the address band of the facing node, and returns a response from the facing node to the request to the microservice infrastructure 2 in the reverse order of the path along which the request has passed.

One of the containers (radius servers 51a to 51c) transmits a request packet to the facing node (the radius client 1). In FIG. 3, the radius server 51c transmits the request packet to the radius client 1. A router (not illustrated) routes the request packet to the load balancer 3. Accordingly, the request packet is relayed to the load balancer 3.

The backward relay unit 34 of the load balancer 3 causes the NAPT unit 35 to rewrite the destination of this request packet to the IP address of the facing node. Accordingly, the request packet is relayed to the radius client 1.

When the request packet is received and a corresponding process is performed, the radius client 1 transmits a response packet to the load balancer 3. The backward relay unit 34 of the load balancer 3 causes the NAPT unit 36 to rewrite the destination of the response packet to the IP address 10.x.x.102 of the server 5b. Accordingly, the response packet is transmitted to the server 5b.

The NAPT unit 55 of the server 5b rewrites the destination of the response packet to an IP address of the original container (for example, the radius server 51c). Here, since the radius server 51c is the original container, the destination of the response packet is rewritten to 10.x.x.104.

For the request packet from the facing node (radius client 1) outside of the microservice infrastructure 2 to the containers (the radius servers 51a to 51c) on the microservice infrastructure 2, a general structure for transmission from the facing node to a destination which is the IP address 10.x.y.6 of the load balancer 3 is used.

On the other hand, for a request packet from the radius servers 51a to 51c on the microservice infrastructure 2 to a facing node outside of the microservice infrastructure 2, a destination address serves as a node outside of the microservice infrastructure 2 and does not pass through the load balancer 3 in a normal method. In order to solve this problem, a configuration that has a function for causing this request packet to pass through the load balancer 3 is used. This function will be described in detail in a second embodiment to be described below.

Effects of First Embodiment

The NFV application requiring IP authentication can be used as a microservice.

Second Embodiment

In a second embodiment, in a case where the load balancer is redundant, a path is switched under conditions described in the state transition diagram. Accordingly, even when a failure occurs in one of the redundant load balancers, the service can be continued.

Figure 4:
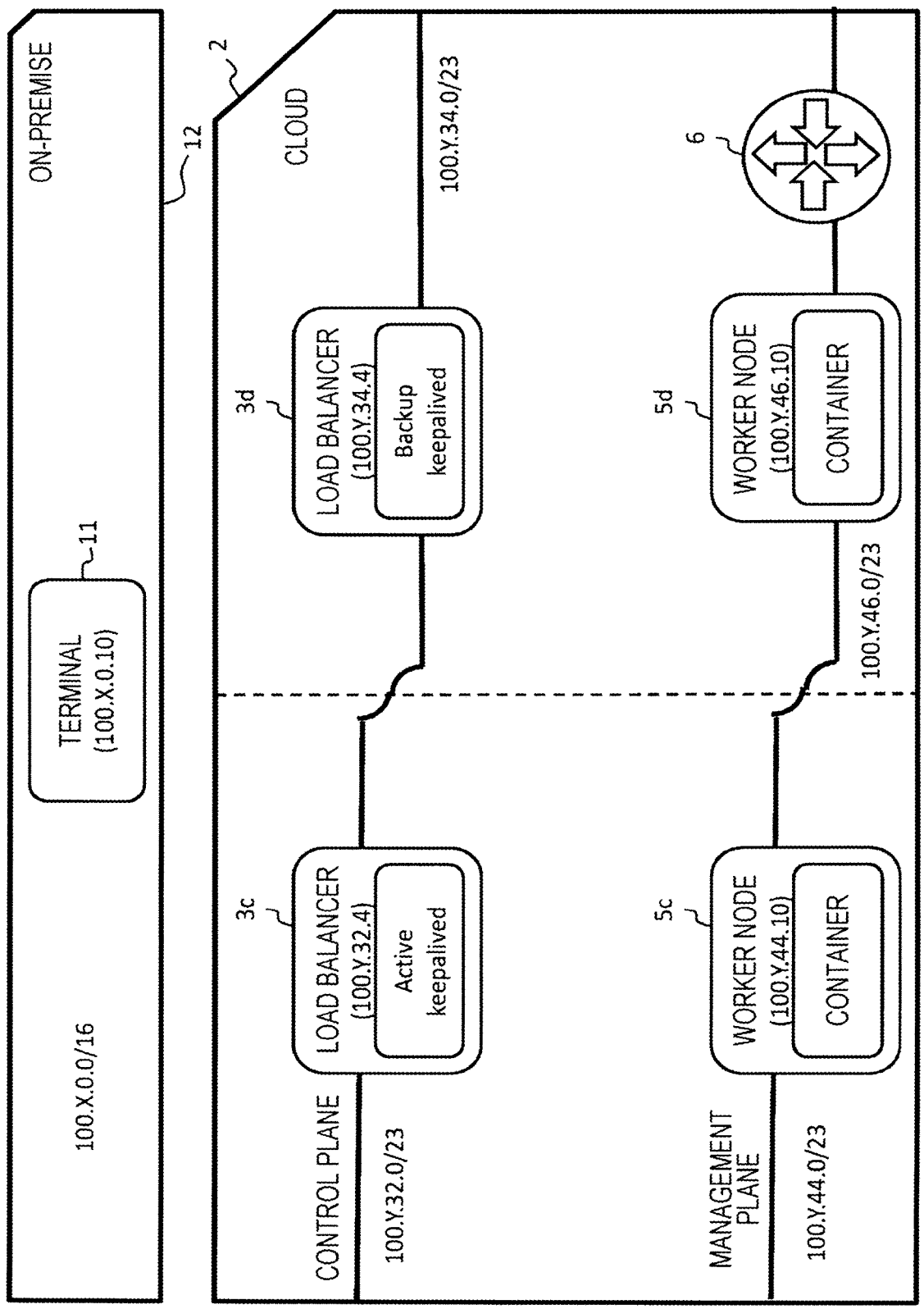
FIG. 4 is a system diagram illustrating the microservice infrastructure and the load balancer.

FIG. 4 is a system diagram illustrating the microservice infrastructure 2 and load balancers 3c and 3d.

In this system, an on-premises 12 and a microservice infrastructure 2 deployed in the cloud are illustrated. The on-premises 12 is an address band of 100.X.0.0/16 and includes terminal 11. The IP address of the terminal 11 is 100.X.0.10.

In the microservice infrastructure 2, the redundant load balancers 3c and 3d are deployed in a control plane, and worker nodes 5c and 5d and a router 6 are deployed in a management plane. The control plane in which the load balancer 3c is deployed is an address band of 100.Y.32.0/23. The control plane in which the load balancer 3d is deployed is an address band of 100.Y.34.0/23. The management plane in which the worker node 5c is deployed is an address band of 100.Y.44.0/23. The management plane in which the worker node 5d is deployed is an address band of 100.Y.46.0/23.

The load balancer 3c functions as a first distribution device. The load balancer 3d functions as a second distribution device. The load balancers 3c and 3d include the forward relay unit 31 and the backward relay unit 34 illustrated in FIG. 3, and also function as a communication relay system.

In FIG. 4, a terminal 11 is a facing node of the microservice infrastructure 2. The load balancers 3c and 3d are two redundant distribution devices. The worker nodes 5c and 5d are the server cluster 4, and each deploys a container therein.

Figure 5:
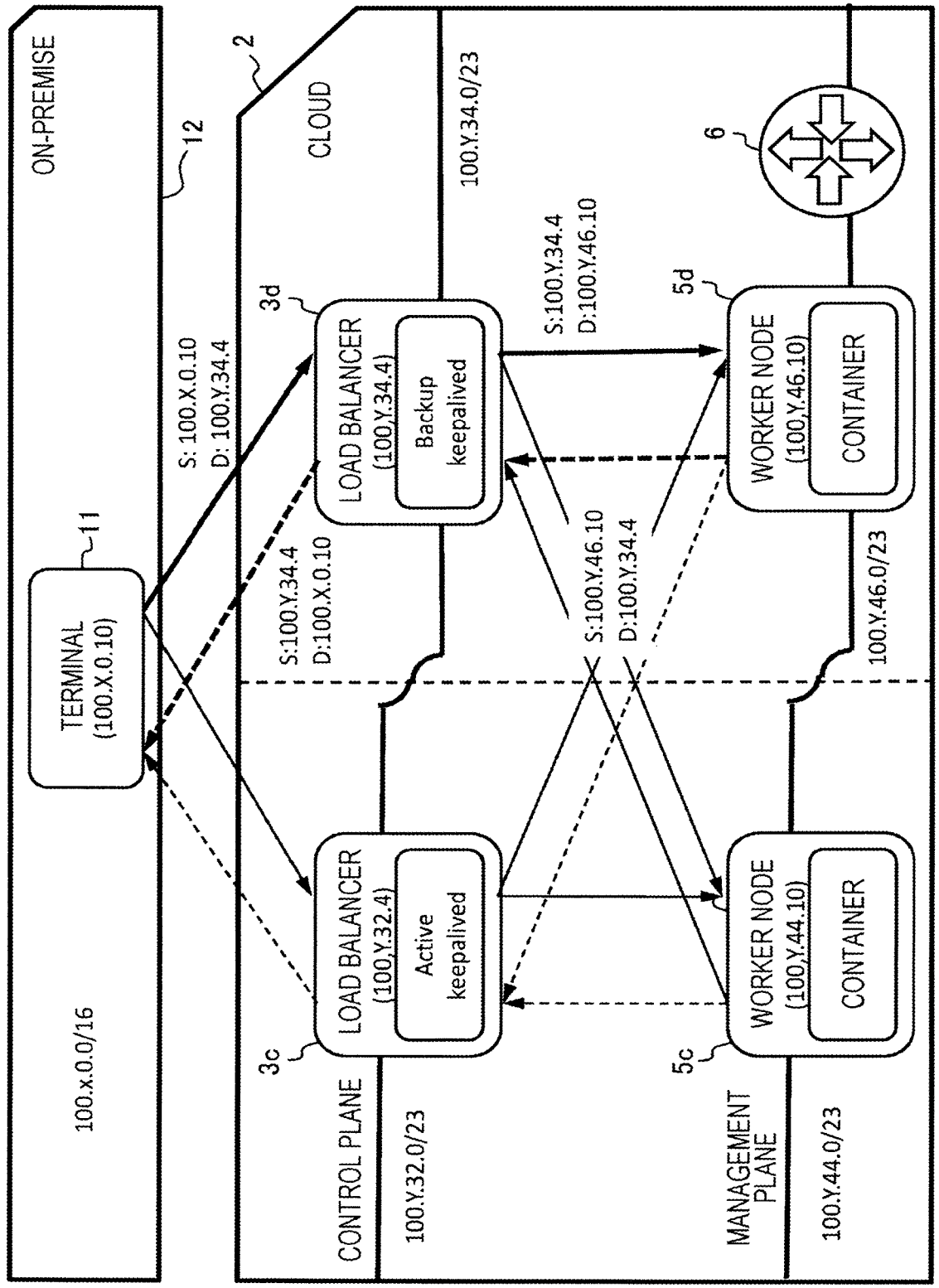
FIG. 5 is a diagram illustrating a flow of a request from the facing node to the container.

FIG. 5 is a diagram illustrating a flow of a request packet from a facing node to a container and a response packet of the request packet.

A flow of a request packet from the facing node to the microservice infrastructure 2 is illustrated in the lower diagram. Here, a solid arrow between nodes indicates a request packet, and a dashed arrow indicates a response packet.

The terminal 11 which is the facing node transmits a request packet to one of the two load balancers 3c and 3d to gain access. Here, a request packet is transmitted to the load balancer 3d. The request packet transmitted from the terminal 11 to the load balancer 3d has a transmission source of 100.X.0.10 and a destination of 100.Y.34.4.

The load balancer 3d causes the forward relay unit 31 illustrated in FIG. 3 to distribute the request packet to one of the worker nodes 5c and 5d. Through this distribution, the forward relay unit 31 of the load balancer 3d causes the NAPT unit 32 to rewrite the transmission source to the own IP address and rewrite the destination to the worker node 5d. The request packet transmitted from the load balancer 3d to the worker node 5d has a transmission source of 100.Y.34.4 and a destination of 100.Y.46.10.

The worker node 5d causes a container deployed therein to process the request packet to generate a response packet. The response packet to the request packet is returned through the path along which the request packet has passed.

The worker node 5d transmits a response packet to the load balancer 3d. A response packet transmitted from the worker node 5d to the load balancer 3d has a transmission source of 100.Y.46.10 and a destination of 100.Y.34.4. That is, the destination of the response packet is the transmission source of the request packet. Accordingly, the worker node 5d can transmit the response packets in the reverse order of the path of the request packet.

The load balancer 3d causes the forward relay unit 31 to rewrite the transmission source to the own IP address and rewrite the destination to the terminal 11 that is the transmission source of the request packet. A response packet transmitted from the load balancer 3d to the terminal 11 has a transmission source of 100.Y.34.4 and a destination of 100.X.0.10. The transmission source of the response packet received by the terminal 11 is the same as the destination of the request packet transmitted by the terminal 11. Accordingly, the terminal 11 can match the request packet to the transmission packet.

Figure 6:
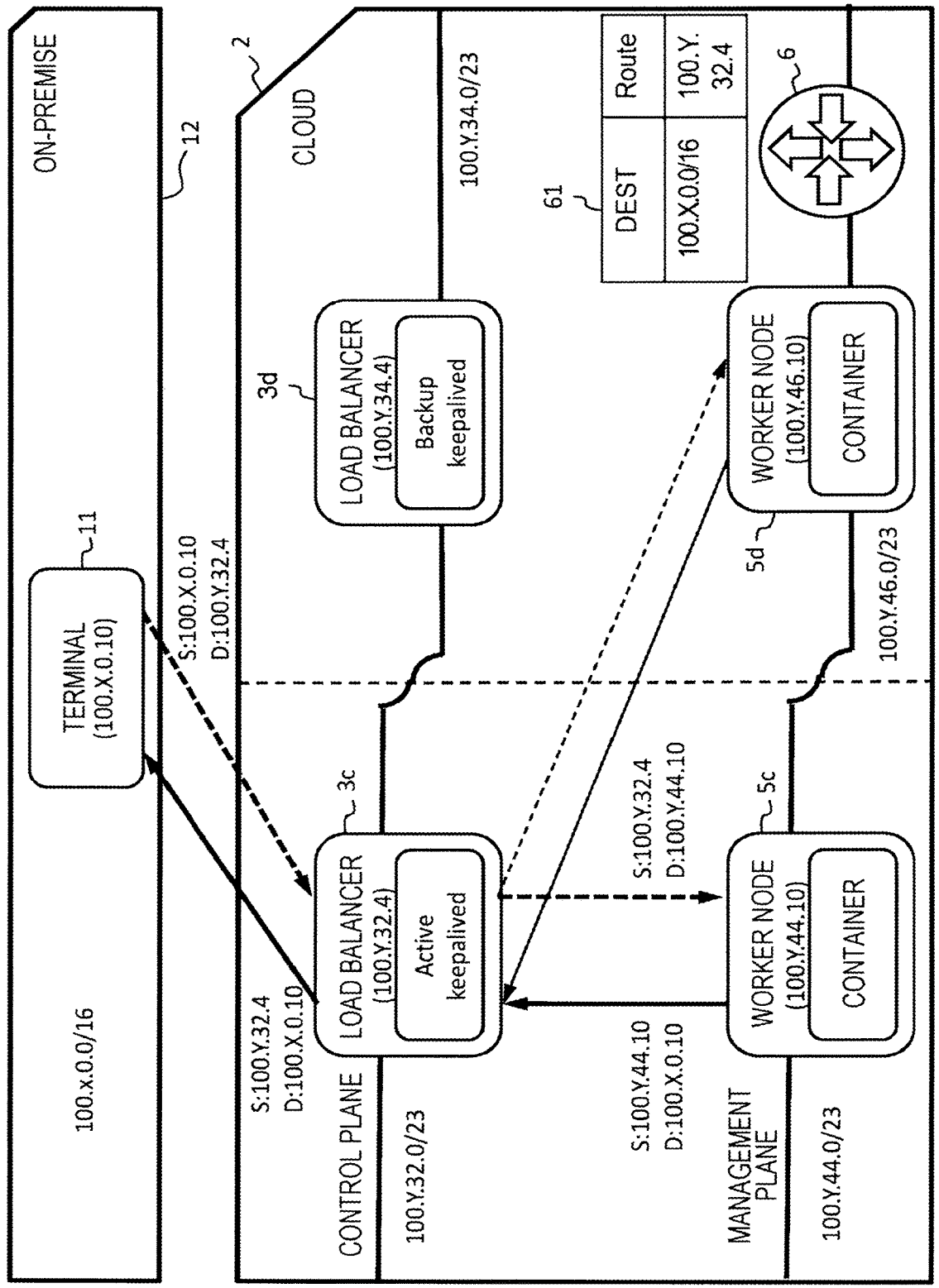
FIG. 6 is a diagram illustrating a flow of a request from the container to the facing node.

FIG. 6 is a diagram illustrating a flow of a request from the container to the facing node.

Here, the flow of the request from the container to the facing node is illustrated, and a radius disconnect request will be described as an example.

In a routing table 61 of the router 6 in a subnet in which the worker nodes 5c and 5d are accommodated, a path is set so that a request packet to the address band of the facing node is routed to the load balancer 3c.

A request packet from the container of the worker node 5c to the facing node is transmitted. This request packet is routed to the load balancer 3c. The request packet routed from the worker node 5c to the load balancer 3c has a source of 100.Y.44.10 and a destination of 100.X.0.10.

The load balancer 3c causes the backward relay unit 34 to rewrite the transmission source of the request packet to the own IP address. The request packet relayed from the load balancer 3c to the terminal 11 has a source of 100.Y.32.4 and a destination of 100.X.0.10. Accordingly, the terminal 11 can determine a destination of the response packet to the request packet. Specifically, by setting the transmission source of the request packet as the destination of the response packet, it is possible to return the response packet along the path through which the request packet has passed.

The terminal 11 processes the request packet to generate a response packet. The response packet to the request packet is returned through the path along which the request packet has passed. Therefore, the transmission source of the request packet is set as the destination of the response packet.

That is, the terminal 11 transmits the response packet to the load balancer 3c. The response packet transmitted from the terminal 11 to the load balancer 3c has a transmission source of 100.X.0.10 and a destination of 100.Y.32.4.

When the response packet is received, the load balancer 3c rewrites the transmission source to the own IP address and rewrites the destination to the worker node 5c. The response packet transmitted from the load balancer 3d to the worker node 5c has a transmission source of 100.Y.32.4 and a destination of 100.Y.44.10.

Figure 7:
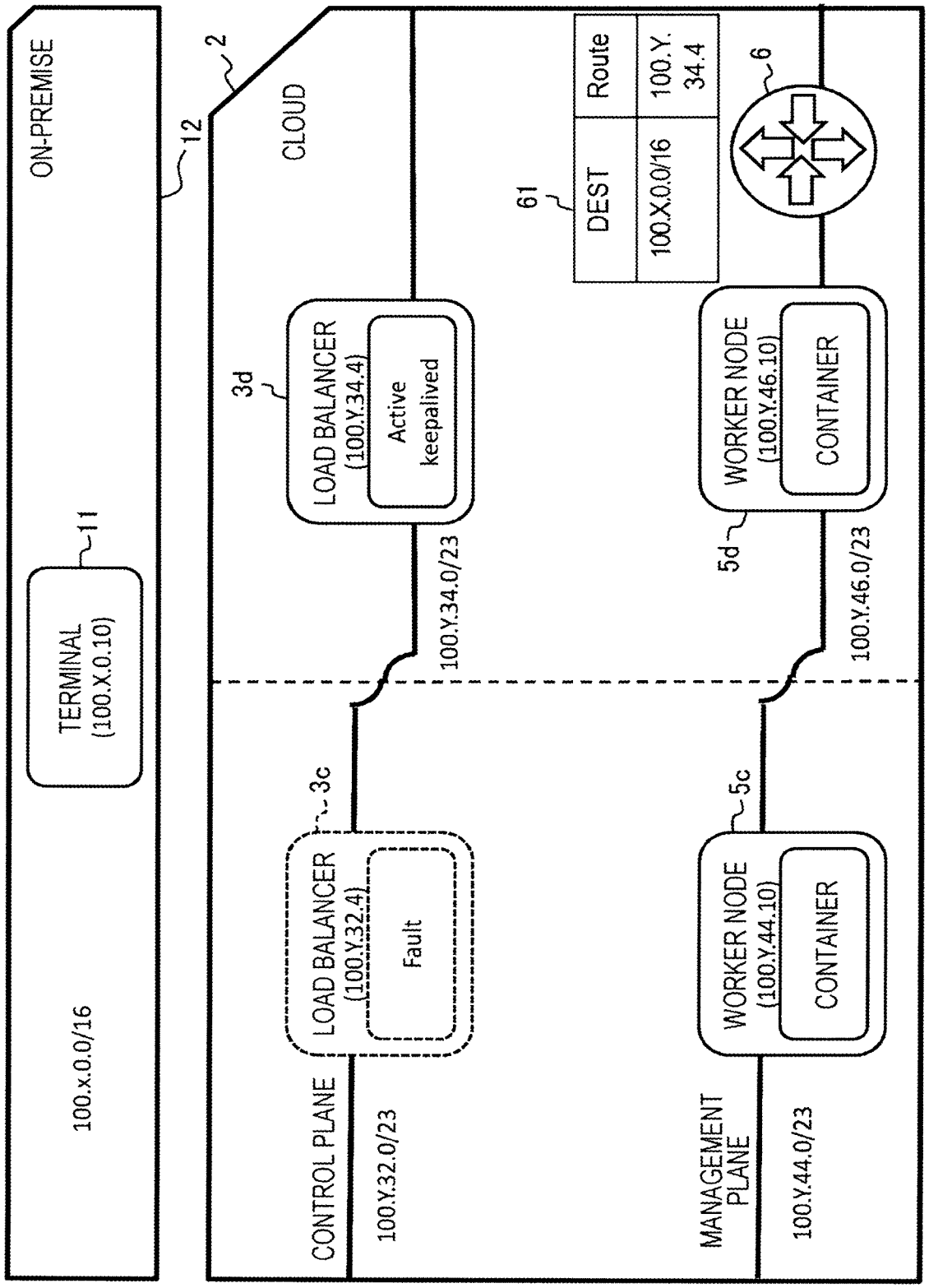
FIG. 7 is a diagram illustrating an operation when a load balancer of an active system is down.

FIG. 7 is a diagram illustrating an operation when a failure occurs in the load balancer 3c of the active system.

Here, when a failure occurs in the load balancer 3c of the active system (Active), the load balancer 3c transitions to a fault state. The load balancer 3d facing the load balancer 3c is promoted from a backup system (Backup) to an active system (Active).

The routing table 61 of the subnet in which the server is accommodated is also changed, and the route (path) is switched to the load balancer 3d. Accordingly, even when a failure occurs in one load balancer, the other load balancer can continuously transmit and receive requests.

Figure 8:
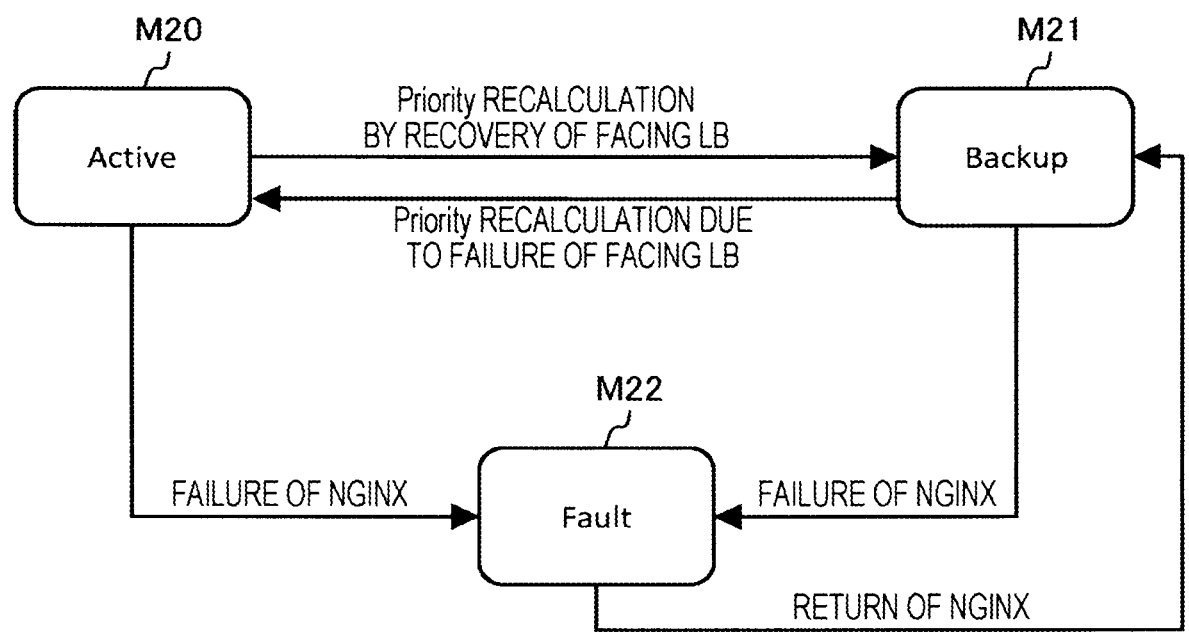
FIG. 8 is a diagram illustrating state transition of Nginx (registered trademark).

FIG. 8 is a diagram illustrating state transition of Nginx (registered trademark).

Nginx (registered trademark) is a free web server program developed as an open source. Hereinafter, Nginx will be described without "(registered trademark)". Nginx implements a function of a load balancer and an HTTP cache in addition to a reverse proxy function. Here, the load balancers 3c and 3d in FIGS. 4 to 7 are implemented by Nginx.

"Active" of mode M20 is a mode in which a load balancer of Nginx operates as an active system. When Nginx fails in mode M20, the mode transitions to "Fault" in mode M22. In mode M20, when priority is recalculated because of recovery of the facing load balancer, the mode transitions to "Backup" in mode M21.

"Backup" of mode M21 is a mode in which the load balancer of Nginx is operating as a backup system. In mode M21, when the priority is recalculated because of a failure of the load balancer, the mode transitions to "Active" in mode M20. When Nginx fails in mode M21, the mode transitions to "Fault" in mode M22.

"Fault" in mode M22 is a mode in which an operation of the load balancer of Nginx is stopped due to a failure. In mode M22, when the own Nginx is recovered, mode M21 transitions to "Backup".

FIG. 9 is a diagram illustrating a state transition table of each of two load balancers operating in Nginx (registered trademark).

An item in each row indicates a state of Nginx before a change. An item in each column indicates a state of Nginx after the change.

When the state of Nginx before the change is "Active" and the state of Nginx after the change is "Backup", a direction destination of a route from the facing node to the microservice infrastructure 2 is an address of a facing network interface card (NIC).

When the state of Nginx before the change is "Active" and the state of Nginx after the change is "Fault", the direction destination of the route from the facing node to the microservice infrastructure 2 is not changed.

When the state of Nginx before the change is "Backup" and the state of Nginx after the change is "Active," the direction destination of the route from the facing node to the microservice infrastructure 2 is the address of the own NIC.

When the state of Nginx before the change is "Backup" and the state of Nginx after the change is "Fault", the direction destination of the route from the facing node to the microservice infrastructure 2 is not changed.

When the state of Nginx before the change is "Fault" and the state of Nginx after the change is "Active or "Backup", the direction destination of the route from the facing node to the microservice infrastructure 2 is not changed.

Figure 10:
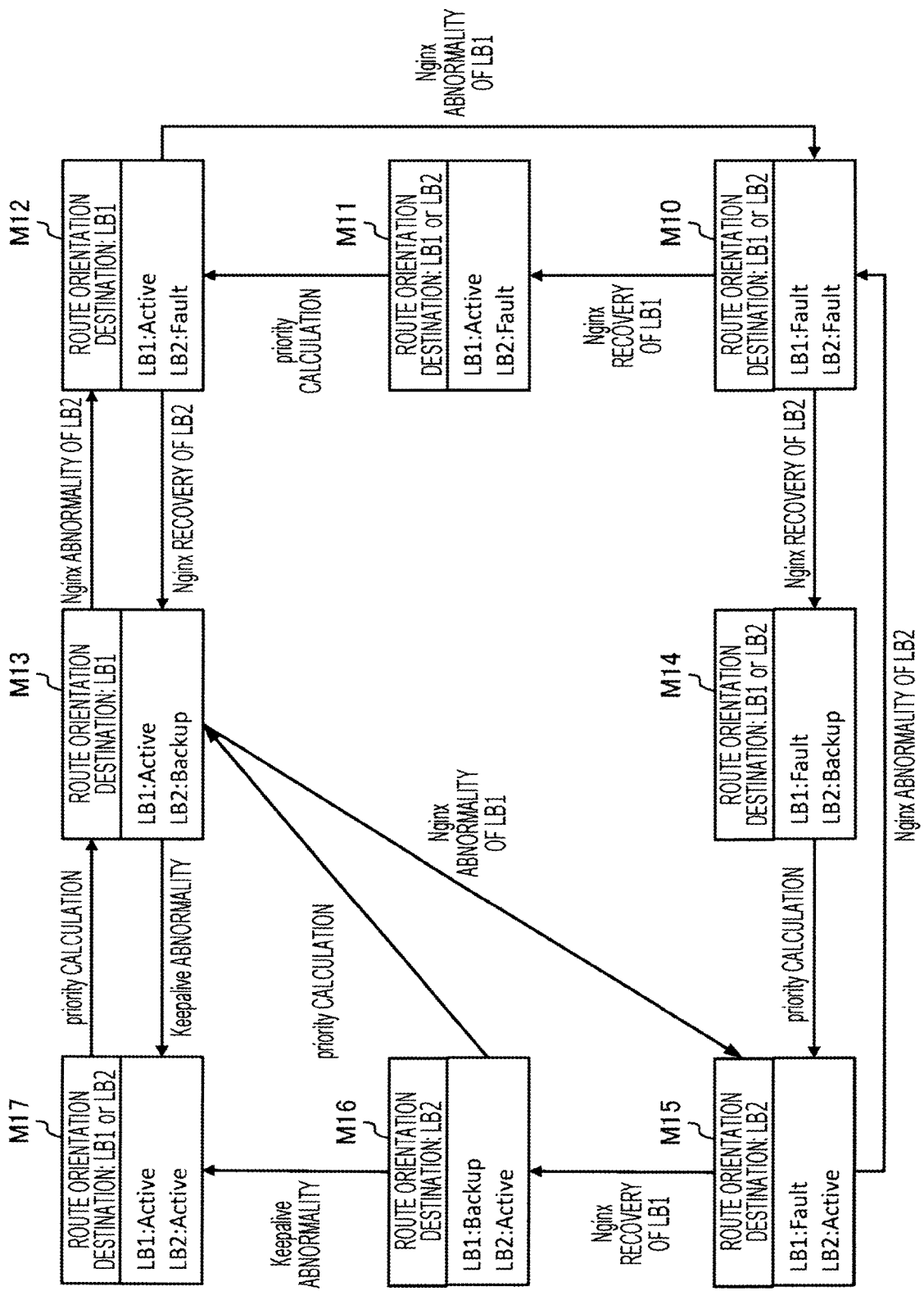
FIG. 10 is a diagram illustrating mode transition in an operation between modes of a routing table according to a fault pattern.

FIG. 10 is a diagram illustrating mode transition in an operation between modes of the routing table 61 according to a fault pattern.

Figure 11:
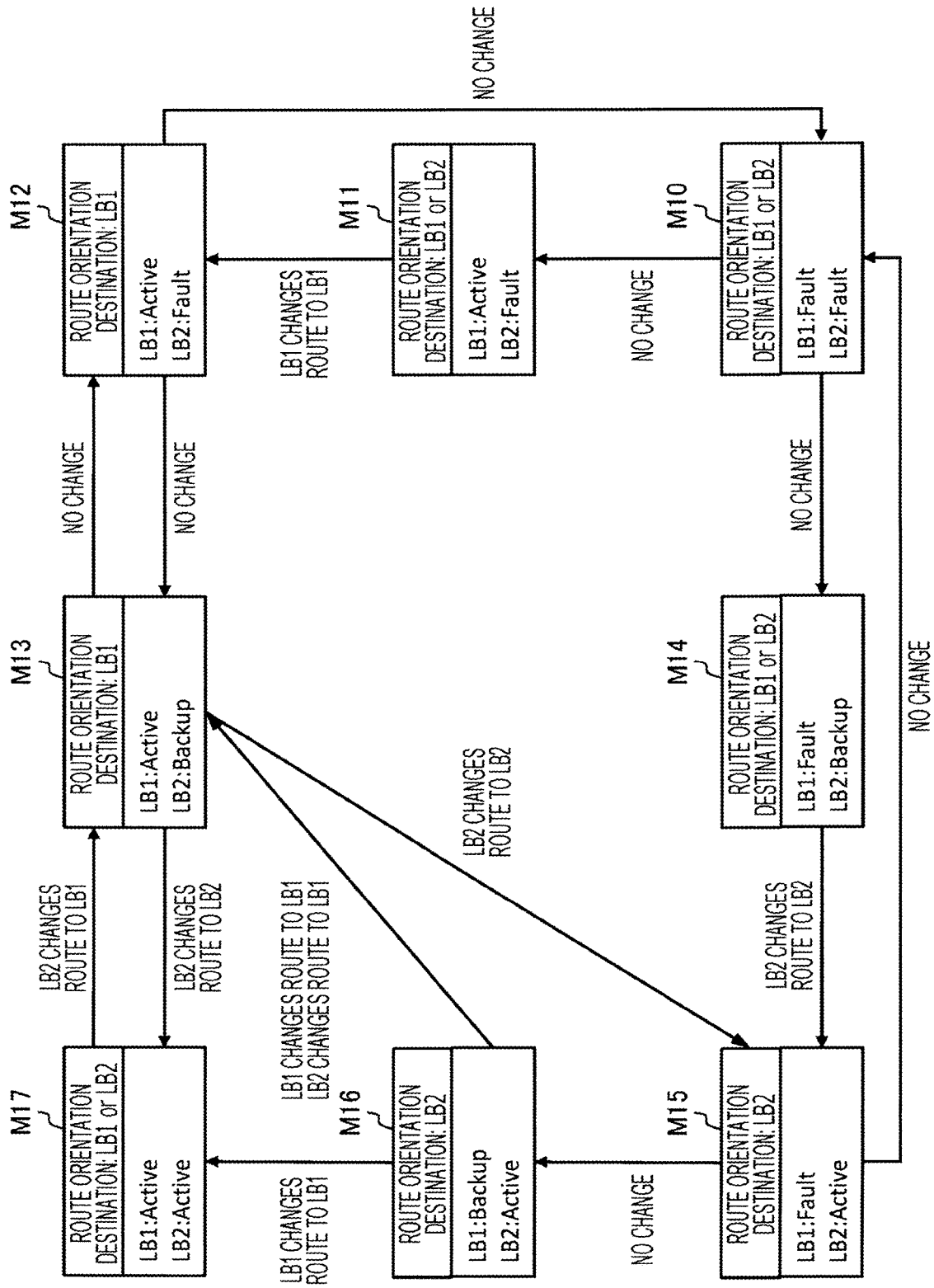
FIG. 11 is a diagram illustrating mode transition in a change in a route direction of a routing table according to a fault pattern.

A change pattern of the routing table 61 (see FIG. 7) in accordance with the fault pattern is illustrated in the following state transition diagram. In FIGS. 10 and 11, LB1 represents the load balancer 3c, and LB2 represents the load balancer 3d. Further, LB1 has a higher priority than LB2.

Mode M10 is a mode in a case where both LB1 and LB2 are in "Fault", and the direction destination of the route from the facing node of the routing table 61 to the microservice infrastructure 2 is LB1 or LB2. In the drawings, a case where the direction destination of the route is LB1 or LB2 is described as "LB1 or LB2". When Nginx of LB1 is restored in mode M10, the microservice infrastructure 2 transitions to mode M11. When Nginx of LB2 is restored in mode M10, the microservice infrastructure 2 transitions to mode M14. Hereinafter, the direction destination of the route from the facing node of the routing table 61 to the microservice infrastructure 2 is simply referred to as a "direction destination of the route".

Mode M11 is a mode in a case where LB1 is in "Active", LB2 is in "Fault", and the direction destination of the route is LB1 or LB2. When priority is calculated in mode M11, the microservice infrastructure 2 transitions to mode M12.

Mode M12 is a mode in a case where LB1 is in "Active", LB2 is in "Fault", and the direction destination of the route is LB1. When Nginx of LB2 is restored in mode M12, the microservice infrastructure 2 transitions to mode M13. When an abnormality of Nginx of LB1 is detected in mode M12, the microservice infrastructure 2 transitions to mode M10.

Mode M13 is a mode in a case where LB1 is in "Active", LB2 is in "Backup", and the direction destination of the route is LB1. When an abnormality of Nginx of LB2 is detected in mode M13, the microservice infrastructure 2 transitions to mode M12. When a keepalive abnormality is detected in mode M13, the microservice infrastructure 2 transitions to mode M17. In mode M13, when an abnormality of Nginx of LB1 is detected, the microservice infrastructure 2 transitions to mode M15.

Mode M14 is a mode in a case where LB1 is in "Fault", LB2 is in "Backup", and the direction destination of the route is LB1 or LB2. In mode M14, when priority is calculated, the microservice infrastructure 2 transitions to mode M15.

Mode M15 is a mode in a case where LB1 is in "Fault", LB2 is in "Active", and the direction destination of the route is LB2. When Nginx of LB1 is restored in mode M15, the microservice infrastructure 2 transitions to mode M16. When an abnormality of Nginx of LB2 is detected in mode M15, the microservice infrastructure 2 transitions to mode M10.

Mode M16 is a mode in a case where LB1 is in "Backup", LB2 is in "Active", and the direction destination of the route is LB2. When the priority is calculated in mode M16, the microservice infrastructure 2 transitions to mode M13. When a keepalive abnormality is detected in mode M16, the microservice infrastructure 2 transitions to mode M17.

Mode M17 is a mode in a case where LB1 is in "Active", LB2 is in "Active", and the direction destination of the route is LB1 or LB2. When the priority is calculated in mode M17, the microservice infrastructure 2 transitions to Mode M13.

In this way, when both LB1 and LB2 are in the operable state, LB1 is promoted to the active system, and LB2 is demoted to the backup system. Accordingly, it is possible to prevent the plurality of distribution devices from simultaneously operating, and it is possible to facilitate recovery when any distribution device fails.

FIG. 11 is a diagram illustrating mode transition in a change in the route direction of the routing table 61 according to the fault pattern. Each mode in FIG. 11 is the same as each mode illustrated in FIG. 10, and the same reference numeral is given.

Mode M10 is a mode in a case where both LB1 and LB2 are in "Fault" and the direction destination of the route is LB1 or LB2. When Nginx of LB1 is restored in mode M10, the microservice infrastructure 2 transitions to mode M11, but the direction destination of the route is not changed at this time. When Nginx of LB2 is restored in mode M10, the microservice infrastructure 2 transitions to mode M14, but the direction destination of the route is not changed at this time.

Mode M11 is a mode in a case where LB1 is in "Active", LB2 is in "Fault", and the direction destination of the route is LB1 or LB2. When priority is calculated in mode M11, LB1 changes the direction destination of the route to LB1, and the microservice infrastructure 2 transitions to mode M12.

Mode M12 is a mode in a case where LB1 is in "Active", LB2 is in "Fault", and the direction destination of the route is LB1. When Nginx of LB2 is restored in mode M12, the microservice infrastructure 2 transitions to Mode M13, but the direction destination of the route is not changed. When the abnormality of Nginx of LB1 is detected in mode M12, the microservice infrastructure 2 transitions to mode M10, but the direction destination of the route is not changed.

Mode M13 is a mode in a case where LB1 is in "Active", LB2 is in "Backup", and the direction destination of the route is LB1. When an abnormality of Nginx of LB2 is detected in mode M13, the microservice infrastructure 2 transitions to mode M12, but the direction destination of the route is not changed. When a keepalive abnormality is detected in mode M13, the LB2 changes the route direction destination to LB2, and the micoservice infrastructure 2 transitions to mode M17.

When an abnormality of Nginx of LB1 is detected in mode M13, LB2 changes the direction destination of the route to LB2, and the microservice infrastructure 2 transitions to mode M15.

Mode M14 is a mode in a case where LB1 is in "Fault", LB2 is in "Backup", and the direction destination of the route is LB1 or LB2. When priority is calculated in mode M14, LB2 changes the route direction to LB2, and the microservice infrastructure 2 transitions to mode M15.

Mode M15 is a mode in a case where LB1 is in "Fault", LB2 is in "Active", and the direction destination of the route is LB2. When Nginx of LB1 is restored in mode M15, the microservice infrastructure 2 transitions to mode M16, but the direction destination of the route is not changed. When an abnormality of Nginx of LB2 is detected in mode M15, the microservice infrastructure 2 transitions to mode M10, but the direction destination of the route is not changed.

Mode M16 is a mode in a case where LB1 is in "Backup", LB2 is in "Active", and the direction destination of the route is LB2. When the Priority is calculated in mode M16, LB1 or LB2 changes the route direction to LB1, and the microservice infrastructure 2 transitions to mode M13. When a keepalive abnormality is detected in mode M16, LB1 changes the route direction destination to the LB1, and the microservice infrastructure 2 transitions to mode M17.

Mode M17 is a mode in a case where LB1 is in "Active", LB2 is in "Active", and the direction destination of the route is LB1 or LB2. When the priority is calculated in mode M17, LB2 changes the direction destination of the route to LB1, and the microservice infrastructure 2 transitions to mode M13.

Effects of Second Embodiment

When the plurality of load balancers 3c and 3d are installed to become redundant in the microservice infrastructure 2, the transition between the modes illustrated in FIGS. 10 and 11 is performed for an operation. Thus, even when a failure occurs in one of the load balancers 3c and 3d, a service can be continued in the other load balancer.

Third Embodiment

Figure 12:
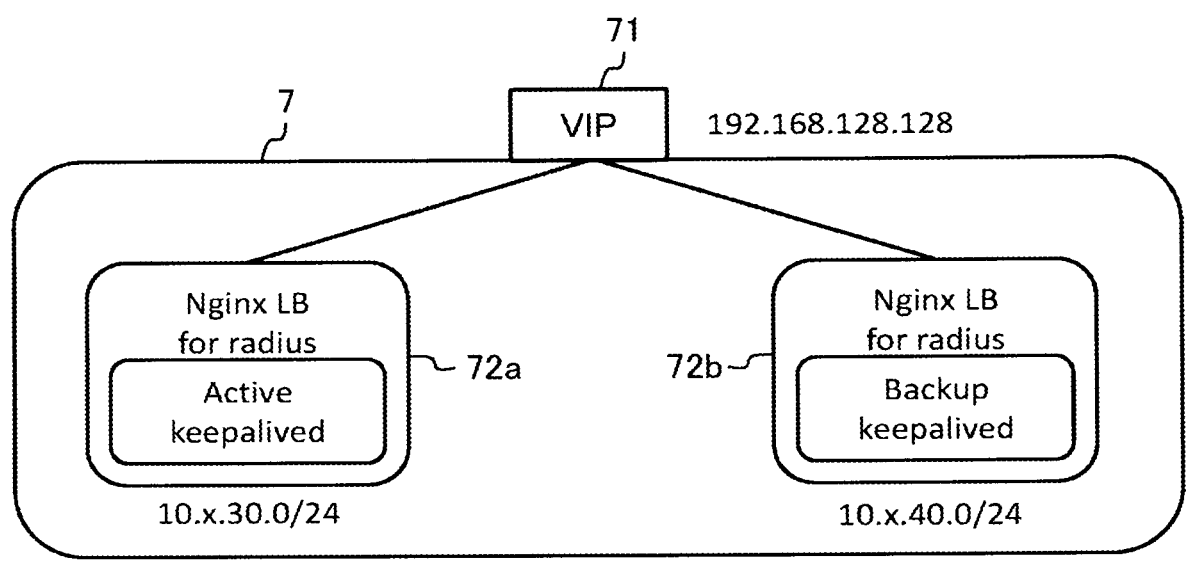
FIG. 12 is a diagram illustrating a load balancer using a virtual IP address.

FIG. 12 is a diagram illustrating the load balancer 7 using a virtual IP address 71.

The load balancer 7 includes a virtual IP address 71, and Nginx load balancers 72a and 72b are deployed therein.

In this case, when a packet for a facing node is transmitted from the server cluster 4, a method of routing the packet to an active side (active system) between the Nginx load balancers 72a and 72b is the same.

In the third embodiment, as in the second embodiment, a routing table is switched when a load balancer fails. In addition, the virtual IP address 71 is replaced. Accordingly, it is possible to easily change a direction destination of a route from the facing node to the microservice infrastructure 2 illustrated in FIG. 11.

Effects of Third Embodiment

The load balancer installed in the microservice infrastructure can become redundant, and thus a service can be continued even when a failure occurs in a load balancer.

<<Modified Examples>>

The present invention is not limited to the foregoing embodiments, and can be modified without departing from the gist of the present invention. For example, there are the following (a) to (c).

(a) An application to which the present invention is applied is not limited to the radius authentication.

(b) A microservice infrastructure according to the present invention is not limited to kubernetes.

(c) A web server program implementing the load balancer according to the present invention is not limited to Nginx.

<<Overview of Present Invention and Effects>>

According to the invention described in (1), a communication relay device includes: a forward relay unit configured to distribute a request from a facing node of a microservice to the microservice to one of server groups accommodating the microservice; and a backward relay unit configured to perform NAPT on a request from the microservice to an address band of the facing node, and return a response from the facing node to the request to the microservice in a reverse order of a path along which the request has passed.

Thus, it is possible to satisfy a requirement of an application of a request transmitted from the microservice to the facing node in the microservice infrastructure on which an NFV application requiring IP authentication is mounted.

According to the invention described in (2), in the communication relay device according to claim 1, the forward relay unit may rewrite a transmission source address of the request to an own address and performs NAPT.

Thus, the microservice can set a destination of the response packet to the communication relay device. Further, the communication relay device can relay a response packet to the facing node that has transmitted the request packet by performing NAPT.

According to the invention described in (3), a communication relay system includes first and second distribution devices that each include a forward relay unit that distributes a request from a facing node of a microservice to the microservice to one of server groups accommodating the microservice; and a backward relay unit that performs NAPT on a request from the microservice to an address band of the facing node and return a response from the requested facing node to the microservice in a reverse order of a path along which the request has passed. One of first and second distribution devices functions as a distribution device of an active system, and the other functions as a distribution device of a backup system.

Thus, the NFV application requiring the IP authentication can be used as a microservice, and the distribution device can become redundant.

According to the invention described in (4), the communication relay system according to claim 3 may further include a router configured to set a path such that a request from the microservice to the address band of the facing node is routed to the distribution device of the active system. When a distribution device of an active system that is one of the first and second distribution devices fails and a distribution device of a backup system that is the other of the first and second distribution devices is promoted to an active system, the distribution device of the backup system may set a path in the router so that the request from the microservice to an address band of the facing node is routed to the own distribution device.

Thus, the NFV application requiring IP authentication can be used as a microservice. Even when a failure occurs in one distribution device, the service can be continued by the other distribution device.

According to the invention described in (5), in the communication relay system according to claim 3, when both the first and second distribution devices are in an operable state, the first distribution device may be promoted to an active system.

Thus, for example, by making the second distribution device lower in performance and less expensive than the first distribution device, it is possible to realize redundancy at low cost.

According to the invention described in (6), there is provided a communication relay method that includes: distributing, by a distribution device, a request from a facing node of a microservice to the microservice to one of server groups accommodating the microservice; and performing, by the distribution device, NAPT on a request from the microservice to an address band of the facing node, and returning a response from the requested facing node the microservice in a reverse order of a path along which the request has passed.

Thus, it is possible to satisfy a requirement of an application of a request transmitted from the microservice to the facing node in the microservice infrastructure on which an NFV application requiring IP authentication is mounted.

According to the invention described in (7), there is provided a communication relay method that includes: distributing, by a first or second distribution device, a request from a facing node of a microservice to the microservice to one of server groups accommodating the microservice; and performing, by the first or second distribution device, NAPT on a request from the microservice to an address band of the facing node and returning a response from the requested facing node to the microservice in a reverse order of a path along which the request has passed. One of first and second distribution devices functions as a distribution device of an active system, and the other functions as a distribution device of a backup system.

Thus, it is possible to satisfy a requirement of an application of a request transmitted from the microservice to the facing node in the microservice infrastructure on which an NFV application requiring IP authentication is mounted.

According to the invention described (8), a program causes a computer to perform: a procedure of distributing a request from a facing node of a microservice to the microservice to one of server groups accommodating the microservice; and a procedure of performing NAPT on a request from the microservice to an address band of the facing node, and returning a response from the requested facing node to the microservice in a reverse order of a path along which the request has passed.

Thus, it is possible to satisfy a requirement of an application of a request transmitted from the microservice to the facing node in the microservice infrastructure on which an NFV application requiring IP authentication is mounted.

REFERENCE SIGNS LIST

1 Radius client
11 Terminal
12 On-premise
2 Microservice infrastructure
3, 3c, 3d Load balancer (distribution device, communication relay device)
31 Forward relay unit
32, 33 NAPT unit
34 Backward relay unit
35, 36 NAPT unit
4 Server cluster
5a Server
5b Server
51a to 51c Radius server
52, 53, 54, 55 NAPT unit
5c, 5d Worker node
6 Router
7 Load balancer
71 Virtual IP address
72a, 72b Nginx load balancer

The invention claimed is:
1. A communication relay device comprising:
a forward relay unit, including one or more processors, configured to distribute a request from a facing node of a microservice to the microservice to one of server groups accommodating the microservice; and a backward relay unit, including one or more processors, configured to perform network address port translation (NAPT) on a request from the microservice to an address band of the facing node, and return a response from the facing node to the request to the microservice in a reverse order of a path along which the request has passed.

2. The communication relay device according to claim 1, wherein the forward relay unit is configured to rewrite a transmission source address of the request to an own address and perform NAPT.

3. A communication relay system comprising:

first and second distribution devices that each include a forward relay unit that includes one or more processors and is configured to distribute a request from a facing node of a microservice to the microservice to one of server groups accommodating the microservice and a backward relay unit that includes one or ore processors and is configured to perform NAPT on a request from the microservice to an address band of the facing node and return a response from the requested facing node to the microservice in a reverse order of a path along which the request has passed, wherein one of first and second distribution devices is configured to function as a distribution device of an active system, and the other is configured to function as a distribution device of a backup system.

4. The communication relay system according to claim 3, further comprising:

a router configured to set a path such that a request from the microservice to the address band of the facing node is routed to the distribution device of the active system;

wherein, when a distribution device of an active system that is one of the first and second distribution devices fails and a distribution device of a backup system that is the other of the first and second distribution devices is promoted to an active system, the distribution device of the backup system is configured to set a path in the router so that the request from the microservice to an address band of the facing node is routed to the own distribution device.

5. The communication relay system according to claim 3, wherein, when both the first and second distribution devices are in an operable state, the first distribution device is promoted to an active system.

6. A communication relay method comprising:

distributing, by a distribution device, a request from a facing node of a microservice to the microservice to one of server groups accommodating the microservice; and performing, by the distribution device, NAPT on a request from the microservice to an address band of the facing node, and returning a response from the requested facing node to the microservice in a reverse order of a path along which the request has passed.

7. The communication relay method according to claim 6, wherein the distribution device functions as a distribution device of an active system or a backup system.

8. The communication relay method according to claim 6, further comprising:

rewriting a transmission source address of the request to an own address and performing NAPT.

9. A non-transitory computer-readable storage medium storing a program causing a computer to function as the distribution device to perform the communication relay method according to claim 6.

* * * * *